United States Patent
Lee

(10) Patent No.: US 10,040,509 B1
(45) Date of Patent: Aug. 7, 2018

(54) CONTROL SYSTEM FOR ELECTRIC BICYCLES

(71) Applicant: Wen-Sung Lee, Taichung (TW)

(72) Inventor: Wen-Sung Lee, Taichung (TW)

( * ) Notice: Subject to any disclaimer, the term of this patent is extended or adjusted under 35 U.S.C. 154(b) by 25 days.

(21) Appl. No.: 15/424,888

(22) Filed: Feb. 6, 2017

(51) Int. Cl.
| | |
|---|---|
| *B62M 6/50* | (2010.01) |
| *B62K 11/10* | (2006.01) |
| *B62M 6/90* | (2010.01) |
| *B62J 6/02* | (2006.01) |
| *B62J 6/04* | (2006.01) |
| *B62J 6/00* | (2006.01) |
| *B62J 11/00* | (2006.01) |
| *H04W 4/00* | (2018.01) |
| *H04M 1/02* | (2006.01) |
| *H04W 4/80* | (2018.01) |

(52) U.S. Cl.
CPC ................ *B62M 6/50* (2013.01); *B62J 6/001* (2013.01); *B62J 6/02* (2013.01); *B62J 6/04* (2013.01); *B62J 11/00* (2013.01); *B62K 11/10* (2013.01); *B62M 6/90* (2013.01); *B60Y 2200/13* (2013.01); *B60Y 2200/91* (2013.01); *B62J 2300/002* (2013.01); *B62J 2300/0006* (2013.01); *B62J 2300/0033* (2013.01); *H04M 1/0202* (2013.01); *H04W 4/008* (2013.01); *H04W 4/80* (2018.02)

(58) Field of Classification Search
CPC ............. B62M 6/50; B62M 6/45; B62M 6/40
See application file for complete search history.

(56) References Cited

U.S. PATENT DOCUMENTS

| | | | | |
|---|---|---|---|---|
| 5,664,636 A * | 9/1997 | Ikuma | ...................... | B62M 6/45 180/206.1 |
| 6,957,129 B2 * | 10/2005 | Hatanaka | ............ | B60L 11/1803 280/210 |
| 7,119,668 B2 * | 10/2006 | Kitamura | ................. | B62J 6/001 340/432 |
| 9,272,751 B2 * | 3/2016 | Searles | .................... | B62M 6/50 |
| 9,545,973 B2 * | 1/2017 | Chun | ....................... | B62M 6/45 |
| 2015/0094890 A1 * | 4/2015 | Dasbach | ................. | B62M 6/50 701/22 |
| 2015/0285657 A1 * | 10/2015 | Sarvestani | ........... | G01C 22/002 702/19 |
| 2016/0052584 A1 * | 2/2016 | Sasaki | ...................... | B62J 99/00 74/594.4 |
| 2016/0121963 A1 * | 5/2016 | Tanaka | ...................... | B60L 7/10 701/22 |
| 2016/0144928 A1 * | 5/2016 | Chun | ....................... | B62M 6/45 701/22 |

\* cited by examiner

*Primary Examiner* — Joseph M Rocca
*Assistant Examiner* — Michael R Stabley

(57) ABSTRACT

An electric bicycle includes two pedals, a motor, a battery providing power to the motor, a first detection member for detecting acceleration of the electric bicycle and trading acceleration of the pedals, and a controller. The controller receives the acceleration of the electric bicycle and the treading acceleration of the pedals from the first detection member, and then controls output of the motor and the battery. When the treading acceleration of the pedals is larger than the acceleration of the electric bicycle, the controller concludes that the resistance from outside to the electric bicycle increases, the controller increases output of the motor and the battery. When the treading acceleration of the pedals is smaller than the acceleration of the electric bicycle, the controller concludes that the resistance from outside to the electric bicycle decreases, the output of the motor and the battery is reduced.

7 Claims, 6 Drawing Sheets

CONTROL SYSTEM FOR ELECTRIC BICYCLES

BACKGROUND OF THE INVENTION

1. Fields of the Invention

The present invention relates to an electric bicycle, and more particularly, to a control system for an electric bicycle.

2. Descriptions of Related Art

One of the conventional electric bicycle control systems known to applicant comprises a body, a rear wheel unit removably connected to the bicycle frame, a detection module connected to a transmission part of the bicycle so as to detect the operation of the transmission part and generate operational signals, a driving module, multiple driving units, a power module and a control module. The driving module includes a driving unit connected to the body and including multiple driving members. The driving units are connected to the driving members and rotatably connected to the rear wheel unit. The power module is electrically connected to the driving module and the detection module. The control module is electrically connected to the driving module, the detection module and the power module. The control module receives the operational signals and calculates a driving signal which is sent to the driving unit. The driving unit then drives the driving members according to the driving signal and drives the driving units. The driving units drive the rear wheel unit to move the bicycle.

However, the conventional control system only adjusts the internal resistance of the transmission in the bicycle. Only torque and speeds of gears are involved in the control system. The conventional control system cannot monitor and adjust the whole momentum of the bicycle. When different riders of different weights operate the bicycle, the conventional control system cannot respond properly.

Besides, the conventional control system cannot properly provide or adjust the assistance power to the bicycle when the bicycle is operated along roads of different inclinations.

The obvious shortcomings of the conventional control system are that the riders still have to tread hard on ascent roads. When the bicycle is operated on downhill roads, the assistance force from the control system cannot be properly reduced, so that the rider has to brake frequently.

The present invention intends to provide a control system for an electric bicycle to improve the shortcomings mentioned above.

SUMMARY OF THE INVENTION

The present invention relates to an electric bicycle and comprises two pedals, a motor and a battery which provides power to the motor. A control system includes a first detection member detects acceleration of the electric bicycle and trading acceleration of the pedals. A controller receives the acceleration of the electric bicycle and the treading acceleration of the pedals from the first detection member, and sends signals to the motor and the battery so as to control output of the motor and the battery.

When the treading acceleration of the pedals is larger than the acceleration of the electric bicycle, the controller concludes that the resistance from outside to the electric bicycle increases, the controller increases output of the motor and the battery. When the treading acceleration of the pedals is smaller than the acceleration of the electric bicycle, the controller concludes that the resistance from outside to the electric bicycle decreases, the controller reduces output of the motor and the battery.

Preferably, the treading acceleration of the pedals is composed of a first component force that has the same direction as the treading acceleration of the pedals, and a second component force that is perpendicular to the direction as the treading acceleration of the pedals. A comparison between a ratio of the first component force to the second component force and the acceleration of the electric bicycle is made, the controller increases or reduces output of each of the motor and the battery according to the comparison.

Preferably, a second detection member is connected to the controller and detects speed and travel distance of the electric bicycle. The controller receives the speed and the travel distance of the electric bicycle. When the speed of the electric bicycle is over 32 km per hour, the two respective outputs of the motor and the battery are stopped.

Preferably, a monitor is connected to the controller, and the controller monitors the battery and displays result of the battery on the monitor. The monitor further displays the speed and the travel distance of the electric bicycle detected by the second detection member.

Preferably, the monitor is wirelessly connected to the controller.

Preferably, the controller includes a motor control interface which is electrically connected to the motor.

Preferably, the controller is electrically connected to a headlight and a taillight. The headlight includes a light sensor which detects brightness of environment, the controller changes output to the headlight according to the detected brightness of environment.

Preferably, the controller includes a blue-tooth transmitting unit which is wirelessly connected to a smart phone.

The primary object of the present invention is to provide a control system for an electric bicycle, wherein the control system adjust the output of the motor and the battery according to detected resistance applied to the electric bicycle.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
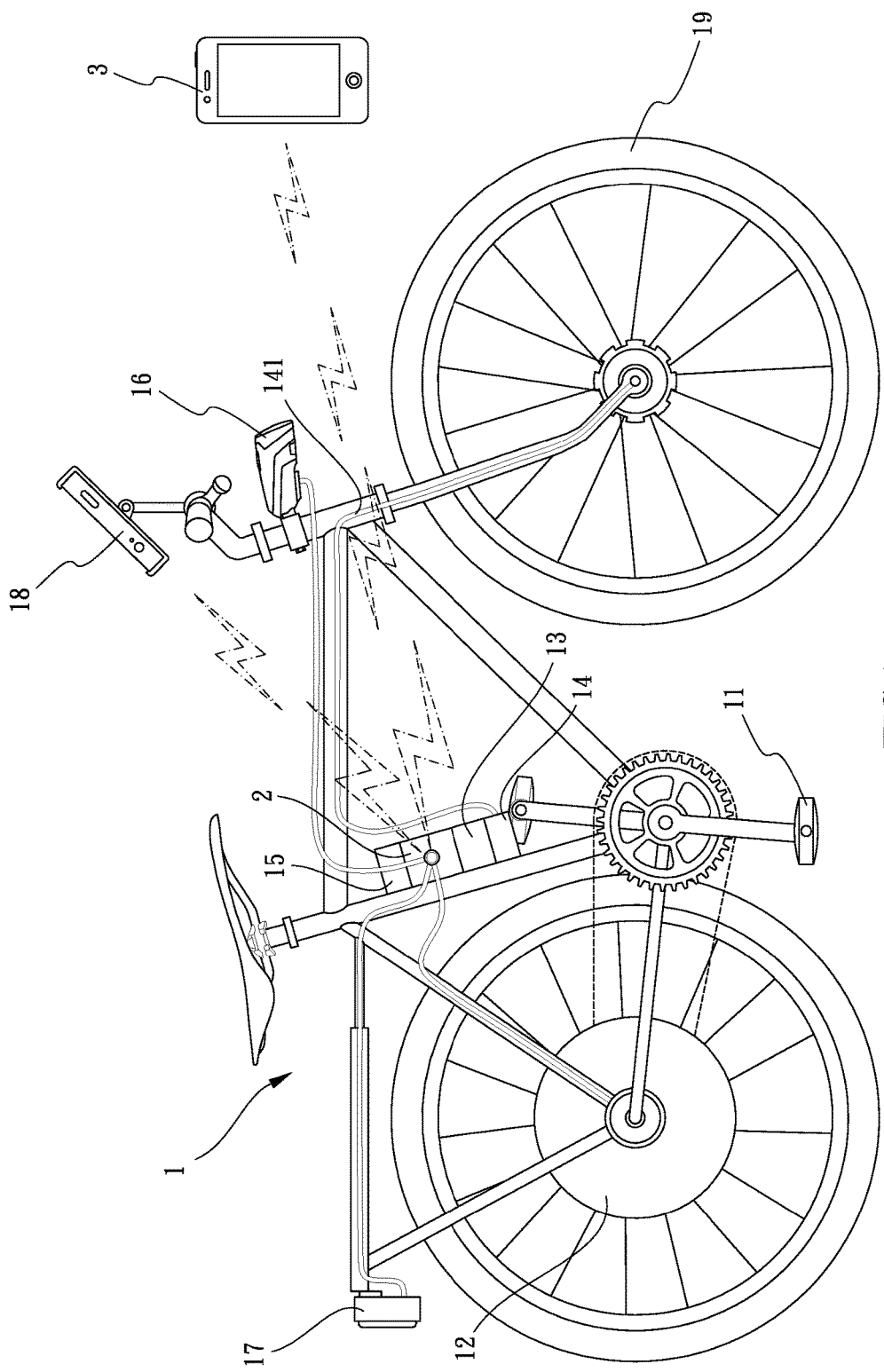
FIG. 1 shows the control system of the present invention is wirelessly connected to a smart phone.
Figure 2:
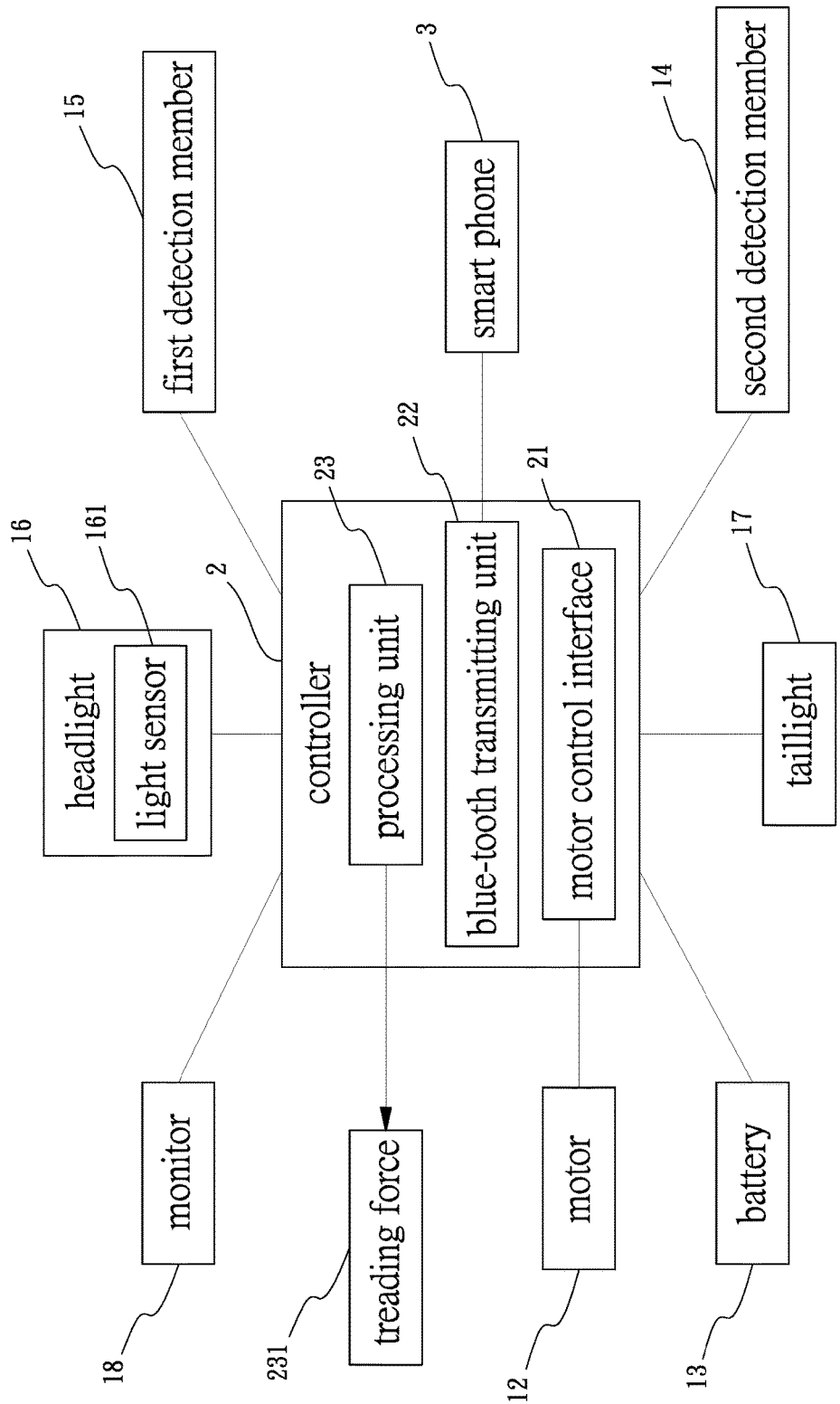
FIG. 2 shows the block diagram of the control system of the present invention.
Figure 3:
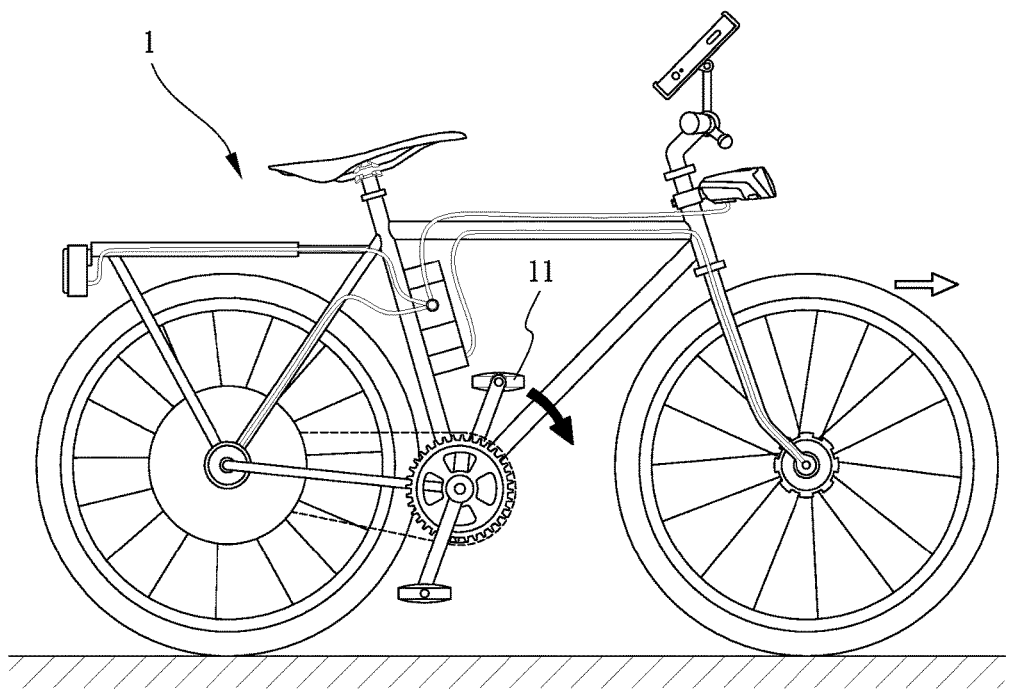
FIG. 3 shows the first and second component forces of the treading acceleration of the pedals.
Figure 3:
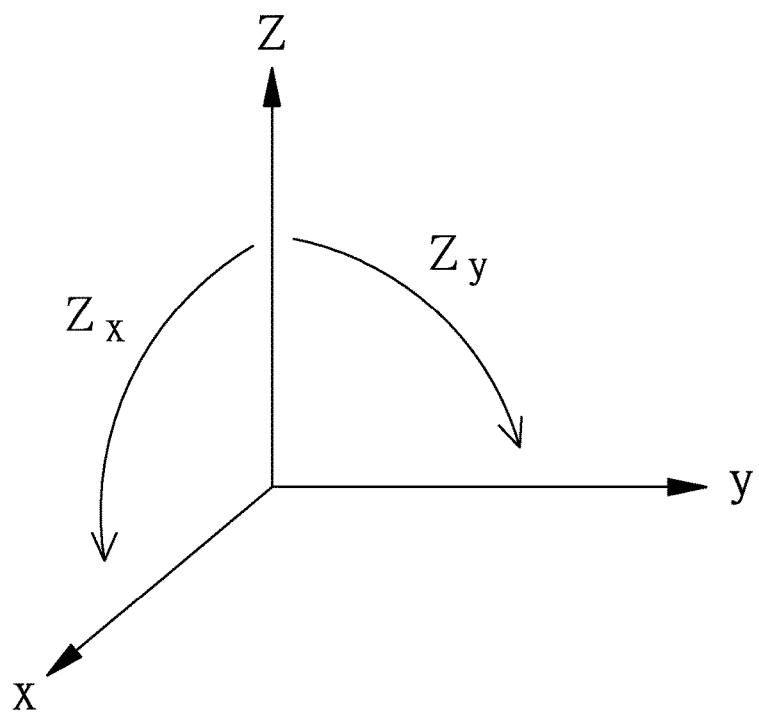

Referring to FIGS. 1 to 3, the electric bicycle 1 comprises two pedals 11, a motor 12 and a battery 13 which provides power to the motor 12. The control system of the present invention comprises a first detection member 15 for detecting acceleration of the electric bicycle 1 and trading acceleration of the pedals 11. A controller 2 receives the acceleration of the electric bicycle 1 and the treading acceleration of the pedals 11 from the first detection member 15, and sends signals to the motor 12 and the battery 13 to control output of the motor 12 and the battery 13.

When the treading acceleration of the pedals 11 is larger than the acceleration of the electric bicycle 1, the controller 2 concludes that the resistance from outside to the electric bicycle 1 increases, so that the controller 2 increases output of the motor 12 and the battery 13. Therefore, the rider does not need to tread hard to move the electric bicycle 1 forward. On the contrary, when the treading acceleration of the pedals 11 is smaller than the acceleration of the electric bicycle 1, the controller 2 concludes that the resistance from outside to the electric bicycle 1 decreases, so that the controller 2 reduces output of the motor 12 and the battery 13. In this situation, the consumption of the battery 13 is stopped so that the power of the battery 13 is saved and can be used when needed.

As shown in FIG. 3, when the pedals 11 are tread in the direction represented by the solid arrowhead marked in front of the pedals 1, the electric bicycle 1 moves forward in the direction represented by the hollow arrowhead (Y axis). The treading acceleration of the pedals 11 is composed of a first component force (arrowhead ZY) that has the same direction (Y axis) as the treading acceleration of the pedals 11, and a second component force (arrowhead ZX) that is perpendicular to the direction as the treading acceleration of the pedals 11. A comparison between a ratio of the first component force to the second component force and the acceleration of the electric bicycle 1 is made, and the controller 2 increases or reduces output of each of the motor 12 and the battery 13 according to the comparison.

Furthermore, a second detection member 14 is connected to the front wheel 19 by a cable 141. The second detection member 14 further is connected to the controller 2 and detects speed and travel distance of the electric bicycle 1. The controller 2 receives the speed and the travel distance of the electric bicycle 1. When the speed of the electric bicycle 1 is over 32 km per hour, the two respective outputs of the motor 12 and the battery 13 are stopped to avoid the electric bicycle 1 from being operated at exceeded speed.

A monitor 18 is connected to the controller 2, wherein the controller 2 monitors the battery 13 and displays result of the battery 13 on the monitor 18. The monitor 18 further displays the speed and the travel distance of the electric bicycle 1 detected by the second detection member 14. The monitor 18 is wirelessly connected to the controller 2. The controller 2 includes a motor control interface 21 which is electrically connected to the motor 12.

The controller 2 further includes a processing unit 23 which includes basic processing data such as the weight of the electric bicycle 1. The processing unit 23 calculates the acceleration of the electric bicycle 1, the treading acceleration of the pedals 11, the speed, the travel distance of the electric bicycle 1, and the treading force 231.

Figure 4:
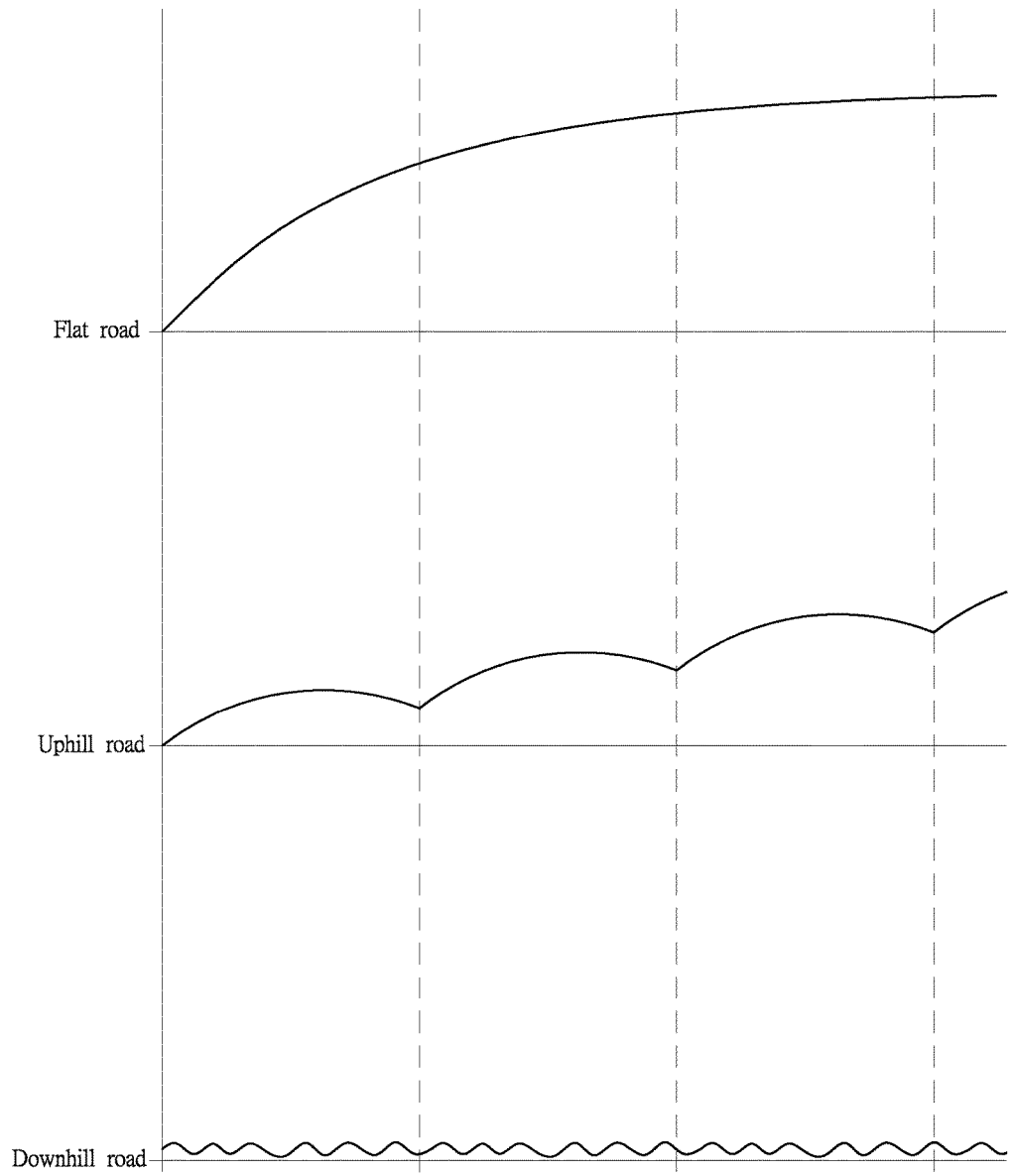
FIG. 4 shows the curves of the output of the motor of the control system of the present invention.

Assume the kinetic energy of the electric bicycle 1, after the rider applies a treading force to the electric bicycle 1, changes from Ek0 to Ek, the work that the trading force makes is $W=\Delta E_K = E_K - E_{K0} = Fd$, wherein the $$Fd = mad = mad = ma\left(\frac{v_2^2 - v_1^2}{2a}\right) = \frac{mv_2^2}{2} - \frac{mv_1^2}{2} = \Delta E_K,$$

wherein $$d = \left(\frac{v_2^2 - v_1^2}{2a}\right), v_2^2 = v_1^2 + 2ad,$$

m is the weight of the electric bicycle 1, v1 and v2 respectively represent the initial speed and the final speed of the electric bicycle 1, a is the acceleration of the electric bicycle 1, d is the travel distance that the electric bicycle 1 travels. F is the value of the trading force 231. By the equation above, the treading force 231 is obtained. When the value of the treading force 231 is larger than 25 Nm, this means that the resistance to the electric bicycle 1 increases, so that the controller 2 commands the motor 12 and the battery 13 to increase their outputs. The curves of the output of the motor 12 are disclosed in FIG. 4. When the electric bicycle 1 is operated on a flat road, and the treading force 231 is larger than 25 Nm, as shown in the top of the curve in FIG. 4, the output of the motor 12 is gradually increased, and the speed is maintained between 25 to 32 km per hour. When the electric bicycle 1 is operated on an uphill road, and the treading force 231 is larger than 25 Nm, as shown in the middle portion of FIG. 4, the output of the motor 12 is increased stage by stage to maintain the speed between 25 to 32 km per hour. When the electric bicycle 1 is operated on a downhill road, the electric bicycle 1 accelerates due to gravity without treading, when the controller 2 acknowledges that the speed is over 32 km per hour, the output of the motor 12 and the battery 13 will be stopped to avoid over-speeding. The curve is disclosed on the lower portion of FIG. 4.

Figure 5:
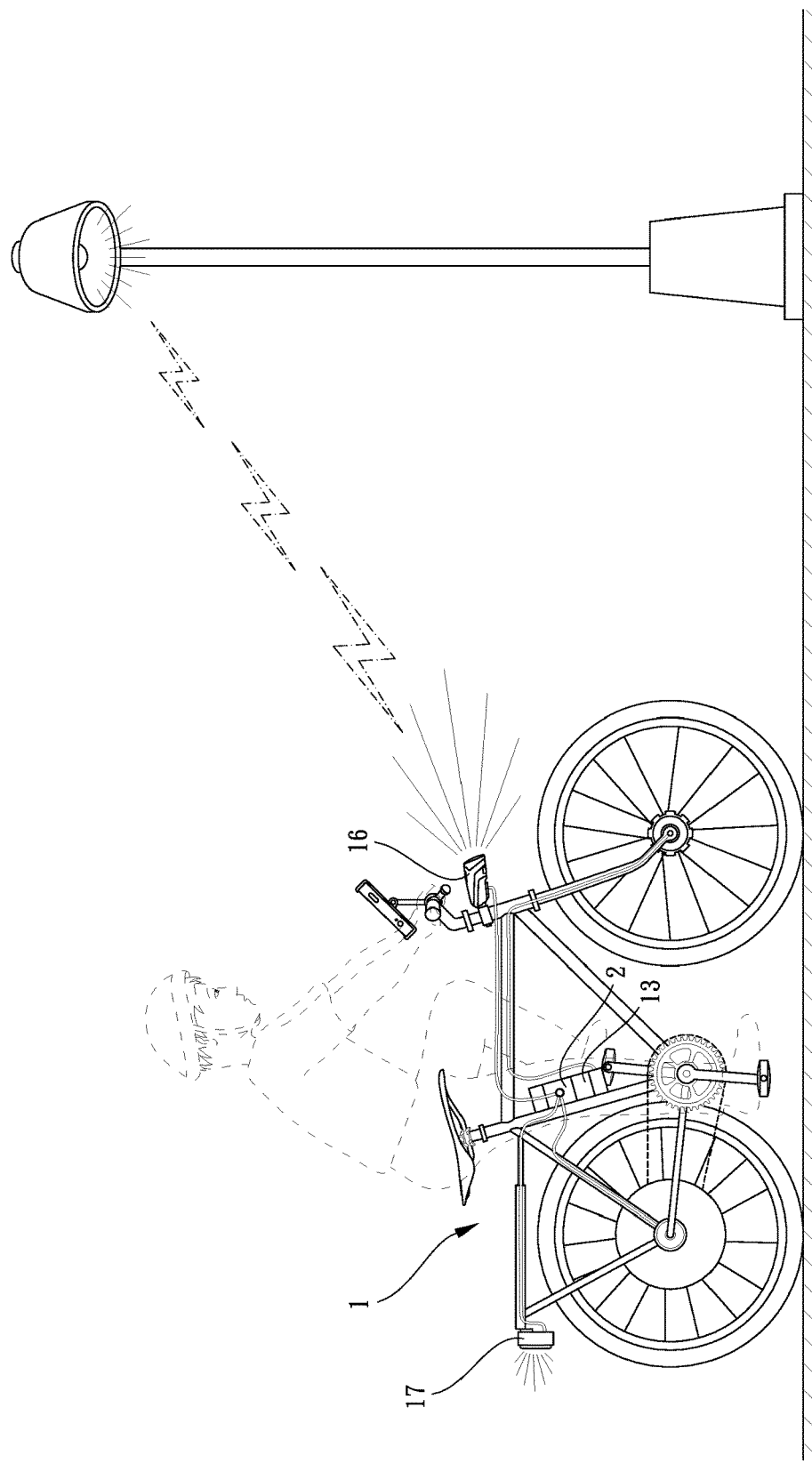
FIG. 5 shows that the light sensor detects the brightness of the environment and the controller controls the headlight.
Figure 6:
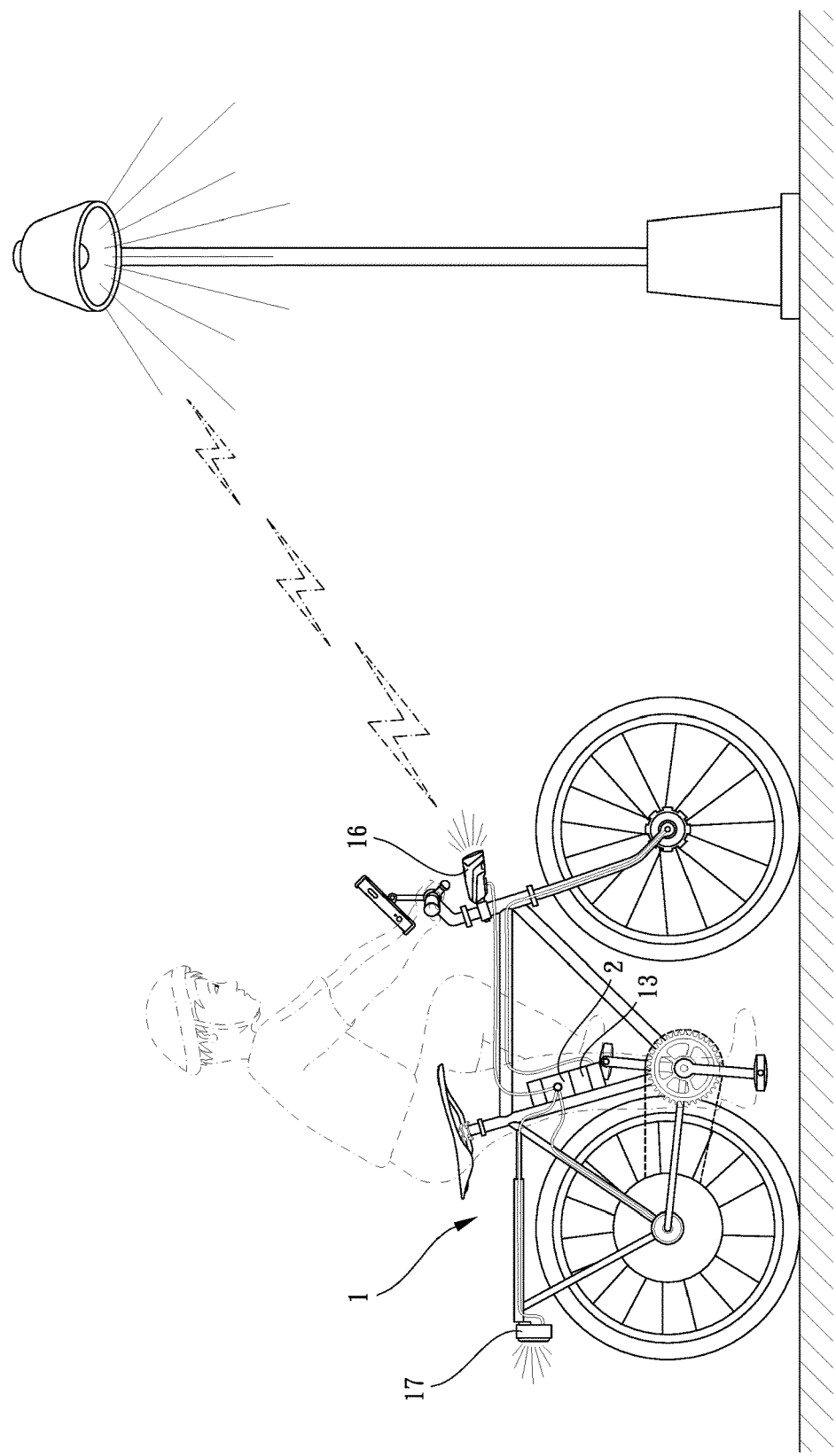
FIG. 6 shows another situation that the light sensor detects the brightness of the environment and the controller controls the headlight.

As shown in FIGS. 5 and 6, the controller 2 is electrically connected to a headlight 16 and a taillight 17, wherein the headlight 16 includes a light sensor 161 which detects brightness of environment. The controller 2 changes output to the headlight 16 according to the detected brightness of environment as shown in FIGS. 5 and 6. Besides, the controller 2 includes a blue-tooth transmitting unit 22 which is wirelessly connected to a smart phone 3 which records the information such as speed, travel distance, riding time, the rider's weight and other physiological information.

The advantages of the present invention are that the controller 2 receives the acceleration of the electric bicycle 1 and the treading acceleration of the pedals 11 from the first detection member 15, and sends signals to the motor 12 and the battery 13 to control output of the motor 12 and the battery 13 so as to assist the rider to operate the electric bicycle easily regardless of the conditions of the road.

The proper response of the motor 12 and the battery 13 according to the road conditions saves the electric power of the battery 13 and prolong the life of use of the motor 12.

While we have shown and described the embodiment in accordance with the present invention, it should be clear to those skilled in the art that further embodiments may be made without departing from the scope of the present invention.

What is claimed is:

1. An electric bicycle (1) comprising:
   two pedals (11), a motor (12) and a battery (13) which provides power to the motor (12);
   a control system having a first detection member (15) for detecting acceleration of the electric bicycle (1) and treading acceleration of the pedals (11), the treading acceleration of the pedals (11) composed of a first component force that has the same direction as the treading acceleration of the pedals (11), and a second component force that is perpendicular to the direction as the treading acceleration of the pedals (11), and a controller (2) receiving the acceleration of the electric bicycle (1) and the treading acceleration of the pedals (11) from the first detection member (15), and a comparison between a ratio of the first component force to the second component force and the acceleration of the electric bicycle (1) being made, the controller (2) sending signals to the motor (12) and the battery (13) according to the comparison so as to control output of the motor (12) and the battery (13), when the treading acceleration of the pedals (11) is larger than the acceleration of the electric bicycle (1), the controller (2) concludes that the resistance from outside to the electric bicycle (1) increases, the controller (2) increases output of the motor (12) and the battery (13), when the treading acceleration of the pedals (11) is smaller than the acceleration of the electric bicycle (1), the controller (2) concludes that the resistance from outside to the electric bicycle (1) decreases, the controller (2) reduces output of the motor (12) and the battery (13).

2. The electric bicycle as claimed in claim 1, wherein a second detection member (14) is connected to the controller (2) and detects speed and travel distance of the electric bicycle (1), the controller (2) receives the speed and the travel distance of the electric bicycle (1), when the speed of the electric bicycle (1) is over 32 km per hour, the two respective outputs of the motor (12) and the battery (13) are stopped.

3. The electric bicycle as claimed in claim 2, wherein a monitor (18) is connected to the controller (2), the controller (2) monitors the battery (13) and displays result of the battery (13) on the monitor (18), the monitor (18) displays the speed and the travel distance of the electric bicycle (1) detected by the second detection member (14).

4. The electric bicycle as claimed in claim 3, wherein the monitor (18) is wirelessly connected to the controller (2).

5. The electric bicycle as claimed in claim 1, wherein the controller (2) includes a motor control interface (21) which is electrically connected to the motor (12).

6. The electric bicycle as claimed in claim 1, wherein the controller (2) is electrically connected to a headlight (16) and a taillight (17), the headlight (16) includes a light sensor (161) which detects brightness of environment, the controller (2) changes output to the headlight (16) according to the detected brightness of environment.

7. The electric bicycle as claimed in claim 6, wherein the controller (2) includes a blue-tooth transmitting unit (22) which is wirelessly connected to a smart phone (3).

* * * * *